(12) United States Patent
Robinson et al.

(10) Patent No.: US 12,330,354 B2
(45) Date of Patent: Jun. 17, 2025

(54) METHOD OF MANUFACTURING A LOAD STRUCTURE

(71) Applicant: Gemini Group, Inc., Bad Axe, MI (US)

(72) Inventors: Mark Robinson, Bad Axe, MI (US); Max Bambach, Kinde, MI (US); Gerald Heilig, Ubly, MI (US)

(73) Assignee: Gemini Group, Inc., Bad Axe, MI (US)

( * ) Notice: Subject to any disclaimer, the term of this patent is extended or adjusted under 35 U.S.C. 154(b) by 449 days.

(21) Appl. No.: 17/743,964

(22) Filed: May 13, 2022

(65) Prior Publication Data
US 2022/0274302 A1   Sep. 1, 2022

Related U.S. Application Data

(63) Continuation-in-part of application No. 16/251,918, filed on Jan. 18, 2019, now Pat. No. 11,331,894.
(Continued)

(51) Int. Cl.
*B29C 45/14* (2006.01)
*B29K 75/00* (2006.01)
*B29L 7/00* (2006.01)

(52) U.S. Cl.
CPC .... *B29C 45/14344* (2013.01); *B29K 2075/00* (2013.01); *B29L 2007/002* (2013.01)

(58) Field of Classification Search
CPC ......... B32B 37/1284; B32B 3/12; B32B 7/12; B32B 17/065; B32B 29/02;
(Continued)

(56) References Cited

U.S. PATENT DOCUMENTS 3,912,569 A   10/1975   Kapral
4,552,913 A   11/1985   Wolfe et al.
(Continued)

FOREIGN PATENT DOCUMENTS

DE         10310368 A1    10/2004
DE    102015002358 A1     8/2016
(Continued)

OTHER PUBLICATIONS

Machine Translation FR 2757794 (Year: 1998).*
(Continued)

*Primary Examiner* — George R Koch
*Assistant Examiner* — Christopher C Caillouet
(74) *Attorney, Agent, or Firm* — Brooks Kushman P.C.

(57) ABSTRACT

A method of manufacturing a load structure may include forming a panel having a first side and a second side, clearing a fill passage through the panel, providing a tool having a first tool portion, a second tool portion, and a cavity disposed between the first and second tool portions, connecting a fill busing to the tool, the fill bushing includes a flange, disposing the panel within the cavity, disposing the fill bushing within the fill passage, connecting an injection gun to the fill bushing, and injecting a material through the fill busing and the fill passage such that one of the first side or the second side of the panel is at least partially covered with the material, the fill bushing is arranged within the fill passage to block the coating from contacting the other one of the first side or the second side.

20 Claims, 13 Drawing Sheets

Related U.S. Application Data

(60) Provisional application No. 62/682,611, filed on Jun. 8, 2018.

(58) Field of Classification Search
CPC ............ B32B 2255/02; B32B 2255/26; B32B 2305/024; B32B 2471/00; B32B 37/146; B62D 25/20; B29C 2045/14967; B29C 45/14344; B29C 44/06; B29C 44/12; B29C 44/18; B60R 13/011; B29L 2031/608
See application file for complete search history.

(56) References Cited

U.S. PATENT DOCUMENTS

| | | | |
|---|---|---|---|
| 4,783,298 | A | 11/1988 | Oda |
| 5,964,491 | A | 10/1999 | Marsh et al. |
| 8,834,985 | B2 | 9/2014 | Preisler et al. |
| 2003/0044548 | A1 | 3/2003 | Kaufmann |
| 2003/0143373 | A1 | 7/2003 | Bledsoe et al. |
| 2004/0018789 | A1 | 1/2004 | Marchbanks et al. |
| 2009/0260736 | A1* | 10/2009 | Charette ........... B29C 45/14065 156/49 |
| 2010/0052211 | A1 | 3/2010 | Chen et al. |
| 2013/0154150 | A1 | 6/2013 | Shimazoe et al. |
| 2016/0176153 | A1 | 6/2016 | Dietz et al. |
| 2018/0290418 | A1 | 10/2018 | Nelson |

FOREIGN PATENT DOCUMENTS

| | | |
|---|---|---|
| EP | 0492532 A2 | 7/1992 |
| FR | 2757794 A1 | 7/1998 |
| FR | 2913385 A1 | 9/2008 |
| JP | S5742713 A | 3/1982 |
| JP | H07171847 A | 7/1995 |

OTHER PUBLICATIONS

European Office Action, 21188984.5, dated Aug. 17, 2022.
European Search Report from corresponding EP19179003 dated Aug. 13, 2019.
Non-Final Office Action; related U.S. Appl. No. 17/683,184; date of mailing Sep. 28, 2024, 33 pgs.

* cited by examiner

METHOD OF MANUFACTURING A LOAD STRUCTURE

CROSS-REFERENCE TO RELATED APPLICATION

This application is a continuation-in-part of U.S. patent application Ser. No. 16/251,918 filed on Jan. 18, 2019, now U.S. Pat. No. 11,331,894 issued on May 17, 2022, which claims the benefit of U.S. Provisional Patent Application No. 62/682,611 filed on Jun. 8, 2018, all of which are hereby incorporated by reference in their entirety.

FIELD OF TECHNOLOGY

The present disclosure pertains to a method of manufacturing a load structure that may be employed, for example, but not limited to, in a vehicle where a load is applied, such as a floor, roofing, and the like.

BACKGROUND

Load structures are incorporated in various applications, for example, as floors, roofing, and the like, in automobiles and other vehicles. The load structures generally are panels having a first side, which may be visible, and a second side, that may be concealed. In some applications, the visible side (sometimes referred to as the "A-side") may be carpeted, and the concealed side (sometimes referred to as the "B-side") may be left bare or have scrim, such as felt, added thereto. The load structure may be installed in a location susceptible to mud, water, high-vapor, and the like. To protect the load structure from such elements, a floor mat is often added over the load structure, which may add weight and additional cost. Another method is to adhesively bond a layer of thermoplastic olefin (TPO), vinyl or similar material to the panel, which is expensive and heavy.

Accordingly, an improved load structure is presented that has reduced weight and/or cost while still providing protection from weather elements, such as mud and water.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

Figure 14:
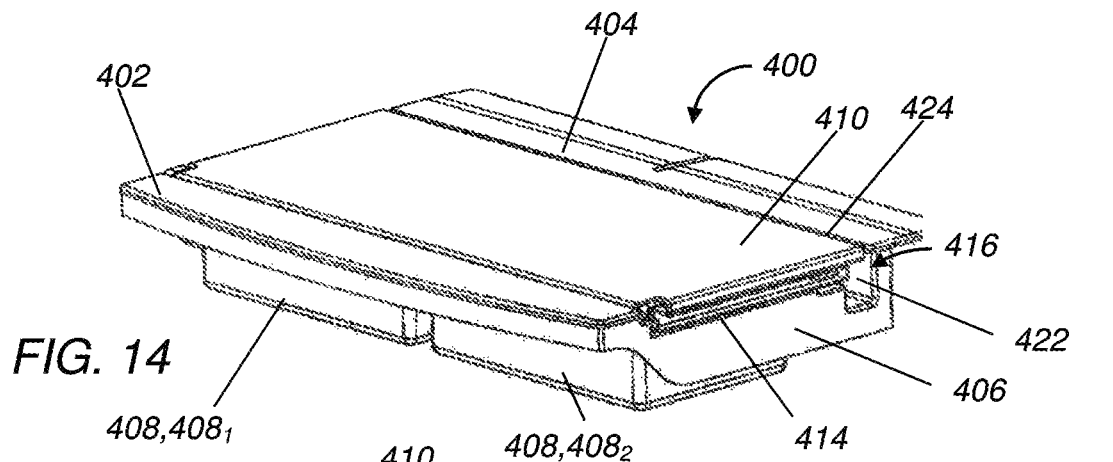
FIGS. 14-16 are different views of a load structure according to another exemplary approach.
Figure 15:
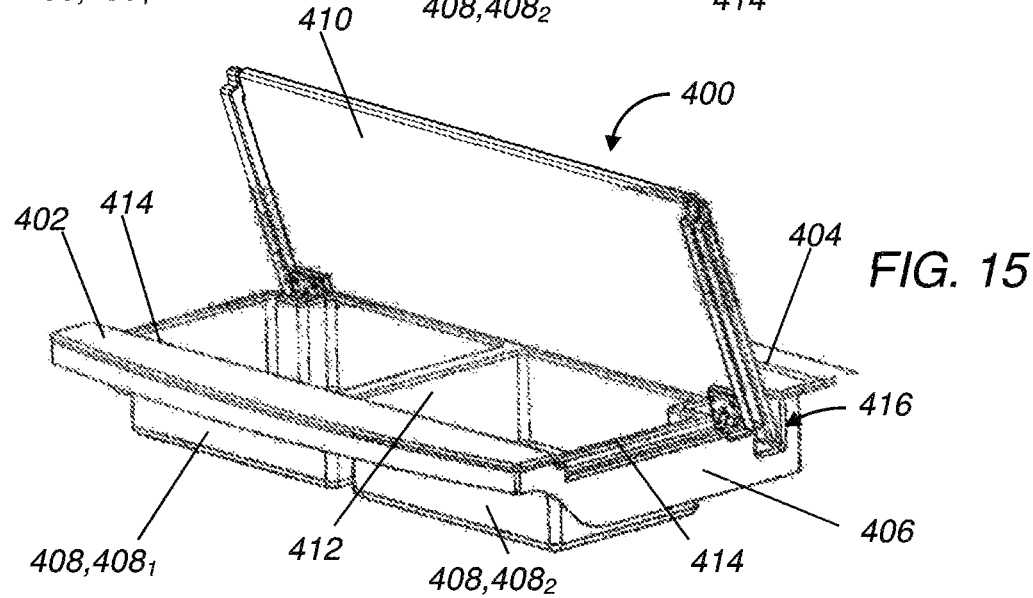
Figure 16:
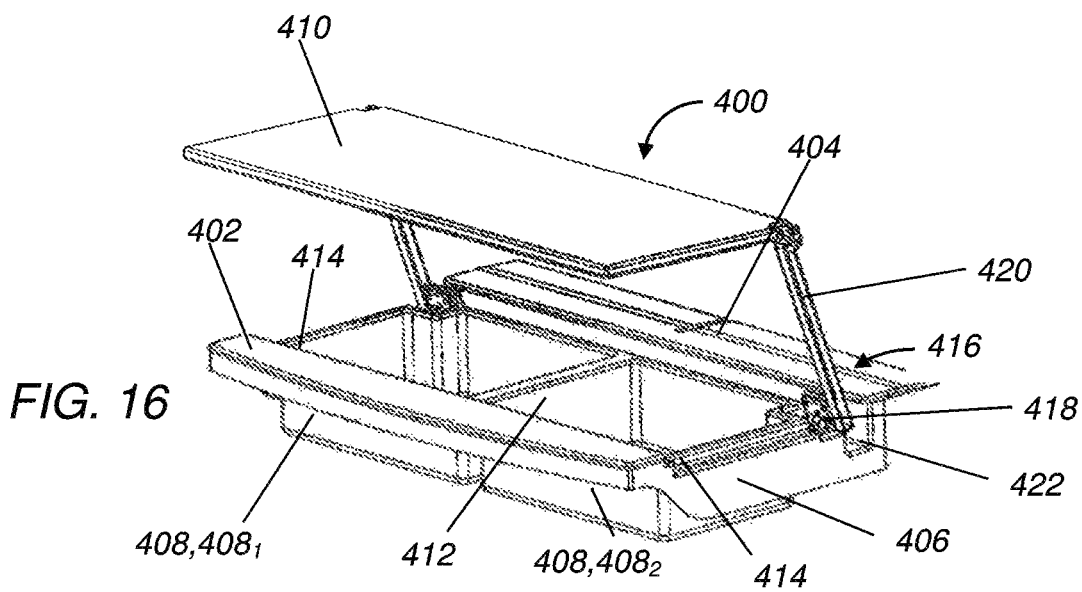

Referring to the figures, FIGS. 1-4 depict load structures 10 according to different exemplary approaches. While the load structures 10 are depicted as a vehicle load floor, it should be appreciated that the load structure may be used and/or embodied in a number of other applications and/or structures, including, but not limited to, floor panels, floor mats, load floors, tail gates, hoods, body panels, vehicle members, vehicle components, component structures, structural members, aircraft members, vessel members, consumer goods, tables, walls, construction members, building components, stall dividers, semi-trailers, truck components, truck beds, cargo vans, and utility trailers. For example, as seen in FIGS. 14-16, the load structures 10 may be embodied as adjustable storage lids in a vehicle, as described in more detail hereinafter.

The load structure 10 generally may include a panel 12, which may have a hollow construction. The panel 12 may have a core 14, which may be made of a honeycomb paper 16 with a layer of glass 18 over the honeycomb paper 16. In some example configurations, a core 14 may include one honeycomb layer 16 (see, e.g., FIG. 2A). In some instances, a core 14 may include more than one honeycomb layer 16, such as a first honeycomb layer 16a and a second honeycomb layer 16b, etc. (see, e.g., FIG. 2B). In examples including more than one honeycomb layer, a first honeycomb layer 16a may be stacked on a second honeycomb layer 16b and/or one or more intermediate layers 40 may be disposed between the first honeycomb layer 16a and the second honeycomb layer 16b (see, e.g., FIG. 2B). In some examples, a plurality of intermediate layers 40 may be disposed between a first honeycomb layer 16a and a second honeycomb layer 16b. For example and without limitation, an intermediate layer 40 may include an adhesive layer, a paper layer, a glass layer, and/or a fiberglass layer, among others.

In some implementations, the glass layer 18 may be random or oriented. The panel 12 may also include a polyurethane coating 20 around the core 14. The polyurethane coating 20 may be a foaming or a non-foaming structure. The polyurethane coating 20 generally provides a cosmetic, cleanable, and waterproof surface, and further allows for the feel, texture, hardness, and/or color of the finished product to be changed.

Figure 1:
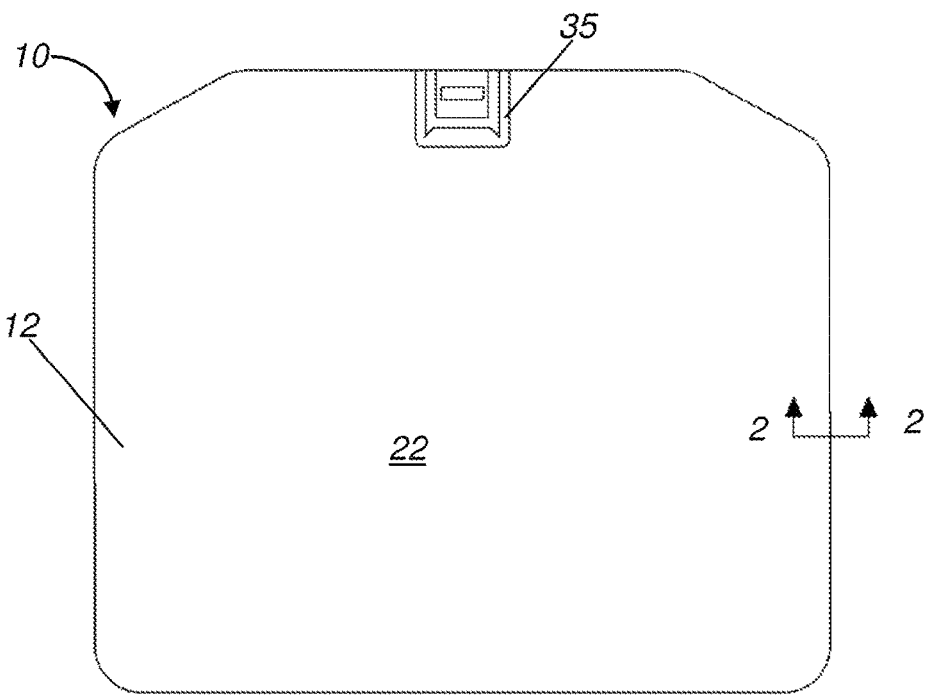
FIG. 1 is a top view of an exemplary load structure having a non-edge-wrapped configuration.

For aesthetics, the panel 12 may be covered on its first side 22 with a layer 23 of various weights of woven and/or non-woven carpets, felt, or similar material. The second side 24 of the panel 12 may be covered with a lighter weight, non-woven, or the glass urethane layer can be left exposed. The first side 22 may be the side exposed to the consumer/user (sometimes referred to as the "A-side"), while the second side 24 may be concealed (sometimes referred to as the "B-side"). Alternatively, the first side 22 may be the B-side, and the second side 24 may be the A-side. In certain embodiments, the load structure 10 may have a non-edge-wrapped configuration in which the layer 23 may be disposed primarily on the first side 22, as illustrated in FIGS. 1 and 2. In other embodiments, the load structure 10 may have an edge-wrapped configuration in which the layer 23 may wrap around an edge of the panel 12 from the first side 22 to the second side 24 at least partially along a perimeter of the panel 12. The layer 23 of carpet or felt may have a thermoplastic polyurethane (TPU) backing (for example, in the non-edge-wrapped configuration and/or may be applied or adhered to the panel 12 via an adhesive (for example, in the edge-wrapped configuration).

The load structure 10 may also include an over rim coating 26 on at least the second side 24 of the panel 12. The coating 26 may be disposed on the first side 22 or the second side 24 of a panel 12. The over rim coating 26 generally may be formed from a resin injected on to the first side 22, the second side 24, and/or any additional portion of a panel 12, as described in more detail hereinafter. The over rim coating 26 may be, but is not limited to, a polyurethane that may be elastomeric or rigid and/or aromatic or aliphatic. As merely one example, the over rim coating 26 may have a thickness ranging between 0.5 mm and 4.0 mm.

The panel 12 may be formed with one or more protrusions 28 that protrude from the second side 24 of the panel 12. The protrusion(s) 28 generally may be provided to help maintain the shape of the panel, e.g., prevent or minimize deflection of the panel 12 due to its span/width, during the injection process of the resin for the over mold coating 26, and ensure that the resin coats the correct side of the panel 12. The protrusion(s) 28 may be "bumps" with rounded surfaces. Alternatively, or in addition, the protrusion(s) 28 may be elongated ribs, though it should be appreciated that the protrusion(s) 28 may have any geometric configuration to maintain the shape of the panel 12 and ensure that the resin coats the correct side of the panel 12. The protrusion(s) 28 may have a height less than the thickness of the over rim coating 26 such that the over rim coating 26 covers the protrusion(s) 28. For example, the height may be a maximum of 0.2 mm less than the thickness of the over rim coating 26.

The load structure 10 may further include a barrier layer 30 on at least the second side of the panel 12 before the over rim coating 26. The barrier layer 30 generally may provide a barrier to the resin of the over rim coating 26 from seeping into the core 14 during the injection process due to the injection pressure associated therewith, which could add weight, cost, and quality issues with the load structure 10. The material of the barrier layer 30 may be a glass, fiber, scrim (e.g., polyester, nylon, etc.), paper, or thermoplastic polyurethane (TPU) or a combination thereof. Where the barrier material is glass, fiber, scrim, or paper, the barrier layer 30 may be disposed on the panel 12 before the polyurethane layer 20. Where the barrier material is TPU, the barrier layer 30 may be disposed on the panel on top of the polyurethane layer 20, as described in more detail hereinafter. The barrier layer 30 may allow the over rim coating 26 to be injected at greater fill pressures without a vacuum. As such, the panel 12 may be molded in its intended color, and therefore, does not need to be coated with a paint layer or sanded in preparation of such painting, thereby further simplifying the manufacturing process. The resulting structure 10 may be color matched to a customer's desired finishing. The barrier layer 30 may be liquid applied sealer, brushed, sprayed or roll coat applied to seal the surface adequately to prevent penetration of over rim material during the injection process, post applied to the panel 12 after it is formed or applied to panel forming tool and bonded as the panel 12 is formed. The liquid sealer generally may be compatible with both the materials used to form the panel 12 and the over rim materially, and do not degrade during processing.

Figure 2A:
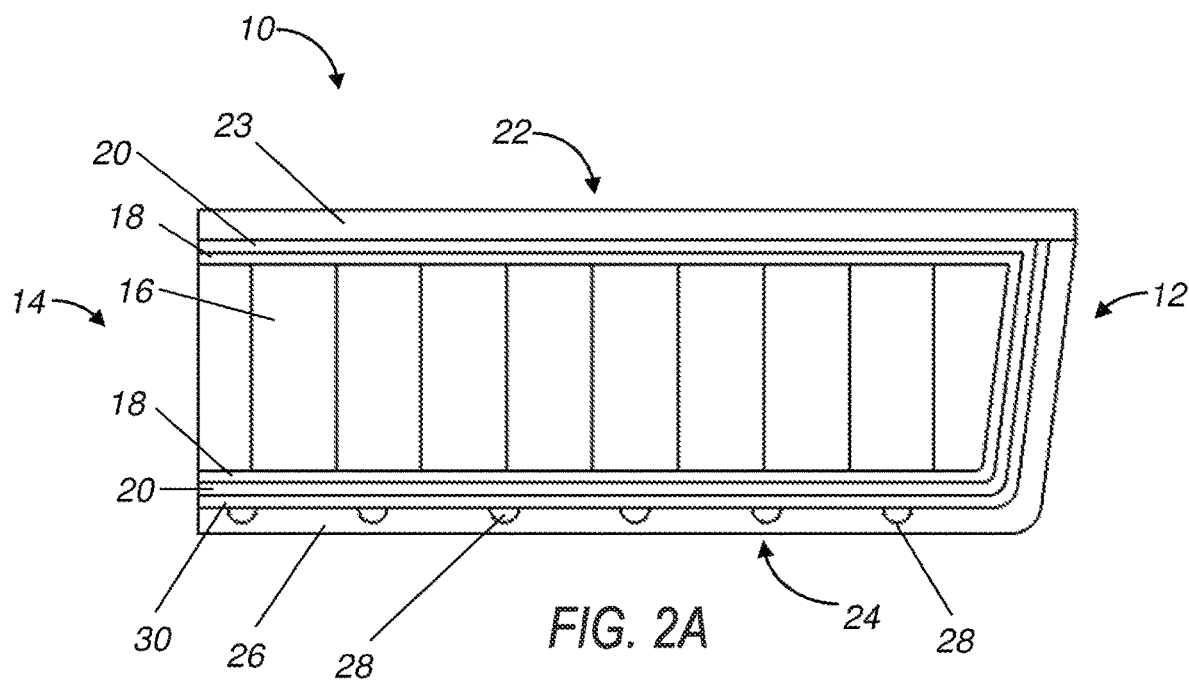
FIG. 2A is a partial cross-section through the load structure of FIG. 1 taken from the perspective of arrows 2-2.
Figure 2B:
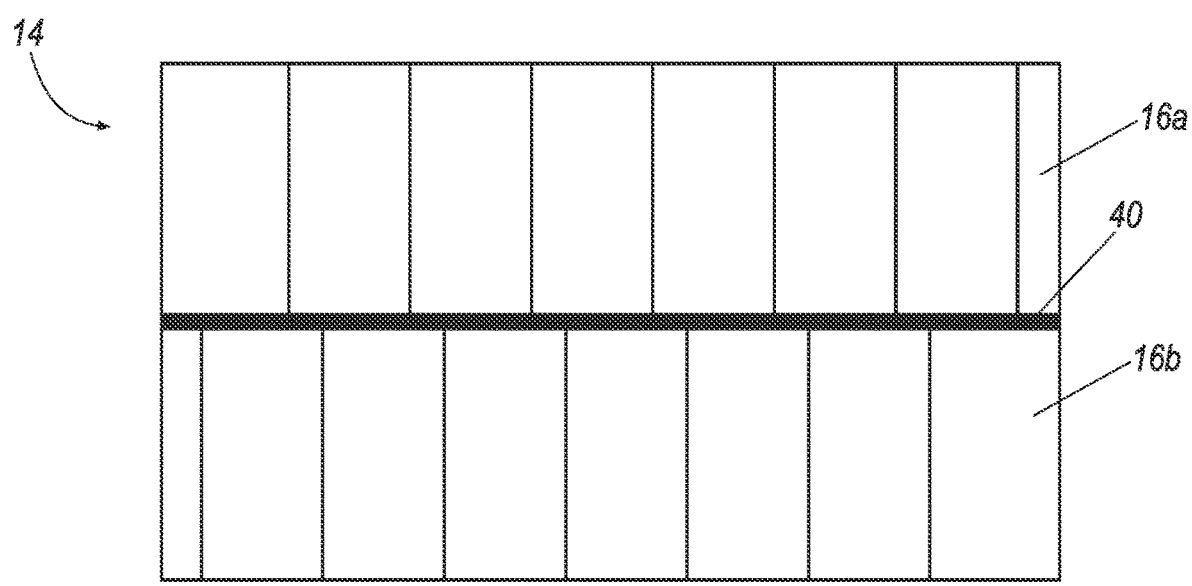
FIG. 2B is a partial cross-section of a core of a load structure.
Figure 3:
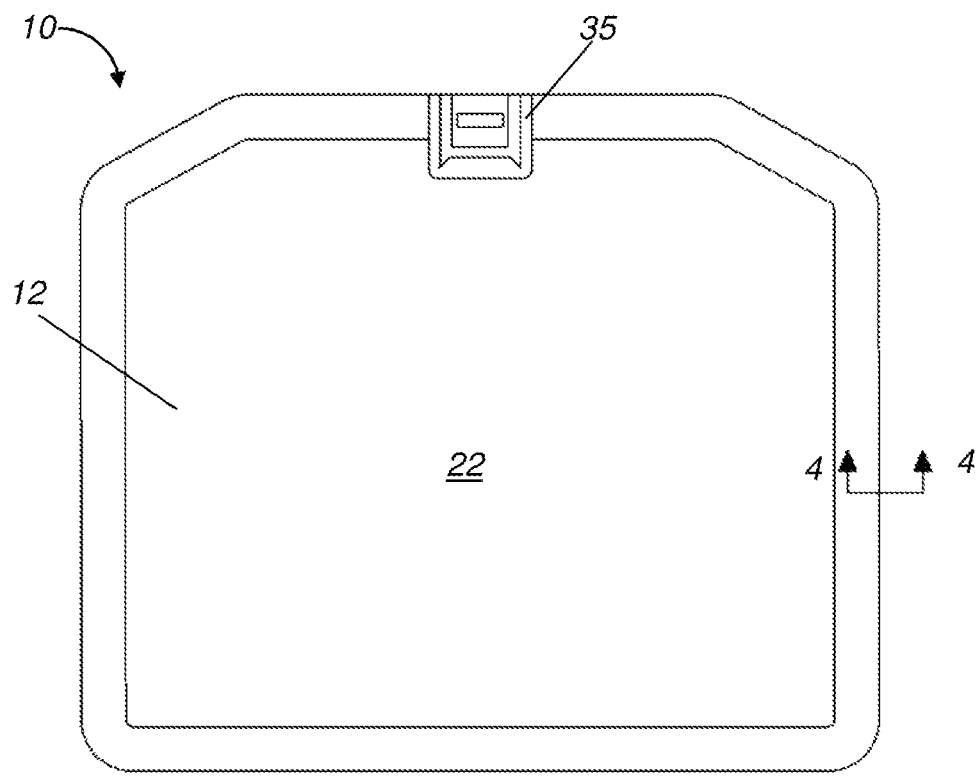
FIG. 3 is a top view of an exemplary load structure having an edge-wrapped configuration.
Figure 4:
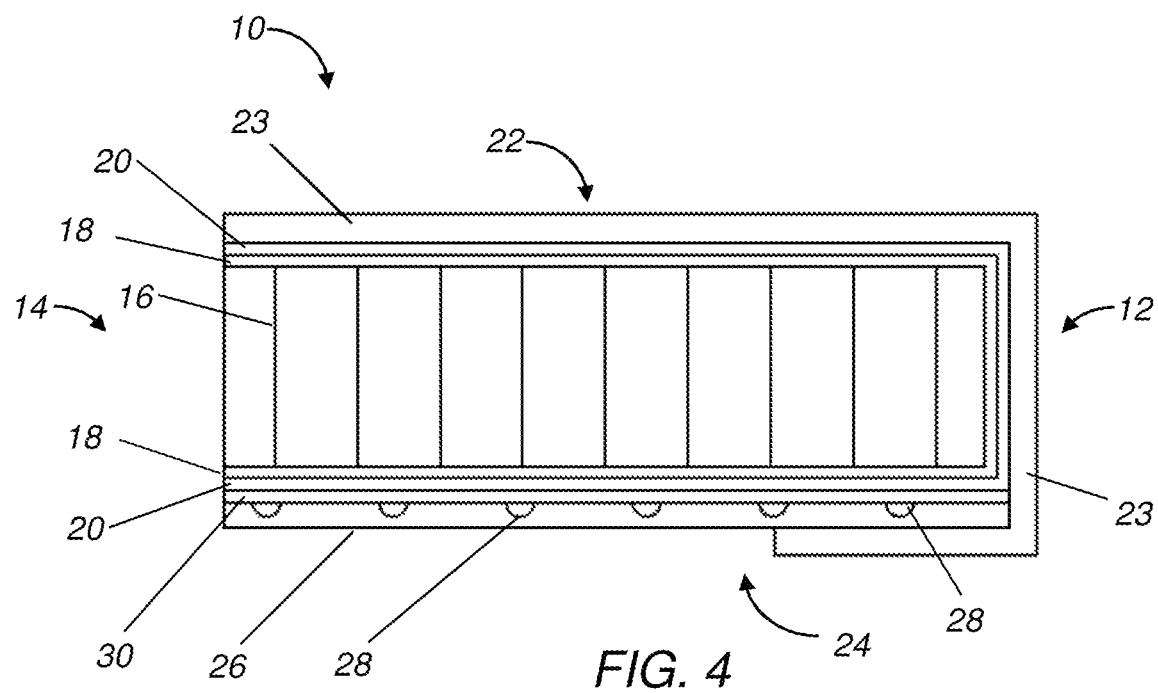
FIG. 4 is a partial cross-section through the load structure of FIG. 3 taken from the perspective of arrows 4-4.
Figure 5:
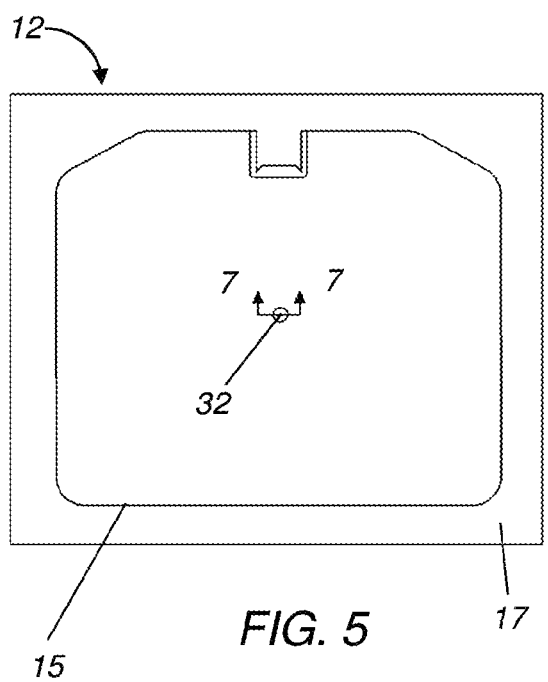
FIG. 5 is a top view of an un-trimmed panel for the load structure of FIGS. 1 and 2.
Figure 6:
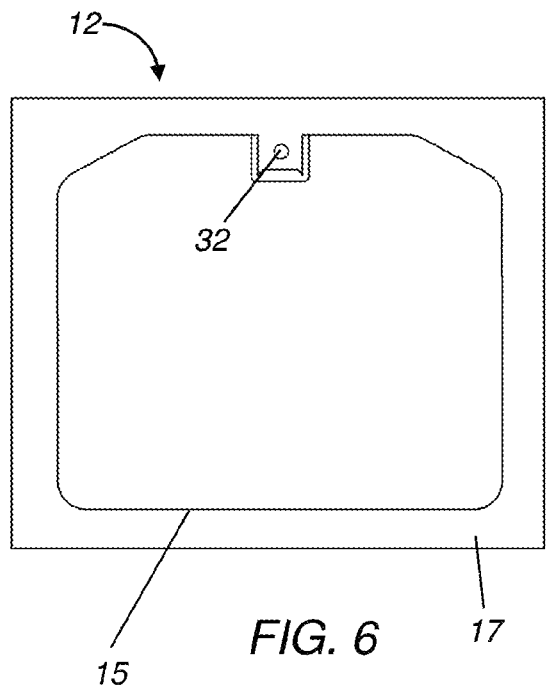
FIG. 6 is a top view of an un-trimmed panel for the load structures of FIGS. 3 and 4.

In the injection process, it is desirable to have laminar flow and low pressure. Because polyurethane systems have a relatively high viscosity, they generally may be 2-part requiring high pressure impingement mixing, the cross-sectional area of the flow path may be relatively small, string gel times may be relatively short, and the available time to inject can be long in comparison. Resistance to flow can create significant back pressure at fill, which means, if the barrier layer is not adequate, some urethane may penetrate into the core. If this penetration occurs, a certain amount of air may be displaced, and may leak into the coating layer at a lower pressure area, causing an imperfection, such as a blister.

Where the load structure 10 has a non-edge-wrapped configuration such as illustrated in FIGS. 1 and 2A, the load structure 10 may also include a fill passage 32 through the panel 12 from the first side 22 to the second side 24, as seen in FIG. 5. The fill passage 32 generally may be the passage through which a coating 26 is injected to coat (e.g., cover) the first side 22, the second side 24, and/or any additional portion of a panel 12. The fill passage 32 may be located within the footprint of the final load structure 10, for example, centrally located, as the carpet or felt layer 23 will cover the fill passage 32. Where the load structure 10 has an edge-wrapped configuration, as illustrated in FIGS. 3 and 4, the fill passage 32 may not be included in the final load structure, but rather may be located outside of the footprint that is trimmed and discarded after the injection process, as seen in FIG. 6, and described in more detail hereinafter. The fill passage 32 may be located in a space that is not where the material of carpet or felt 23 is located (see FIG. 6). In either configuration, the load structure 10 may further include a handle 35 or any other external feature attached to the panel 12 (see, e.g., FIG. 12).

Figure 7:
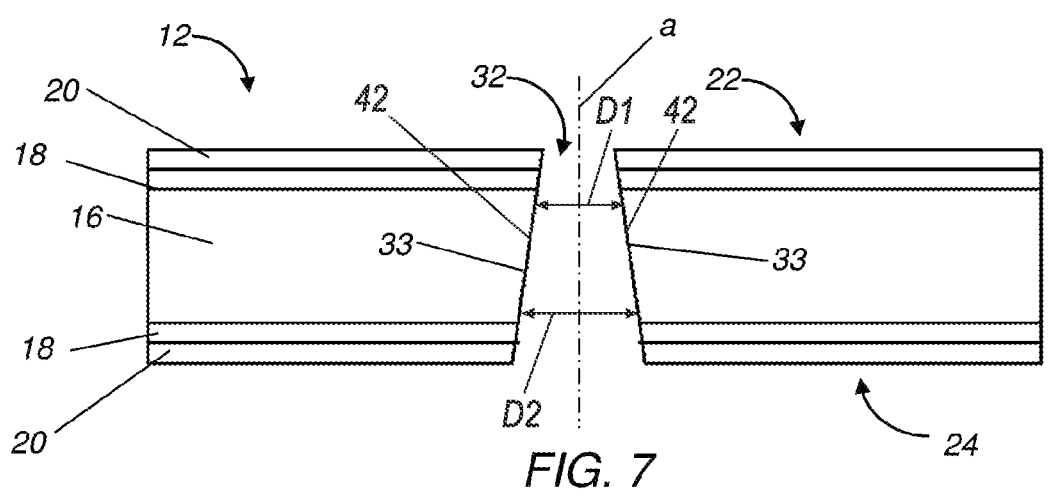
FIG. 7 is a partial cross-section through the untrimmed panels of FIGS. 5 and 6 taken from the perspective of arrows 7-7.

Referring to FIG. 7, a fill passage 32 may be defined by an interior wall 42 of a panel 12. In some example configurations, a fill passage 32 may be tapered 33 from the second side 24 to the first side 22. For example, the fill passage 32 may have a slope of approximately 4 degrees with respect to an axis a of the fill passage 32. The fill passage 32 may include a slope of less than or greater 4 degrees with respect to the axis a. The fill passage 32 may have a first diameter D1 disposed proximate a first side 22 of a panel 12 and/or a second diameter D2 disposed proximate a second side 24 of the panel 12. In some instances, the first diameter D1 may be smaller than the second diameter D2.

Figure 12:
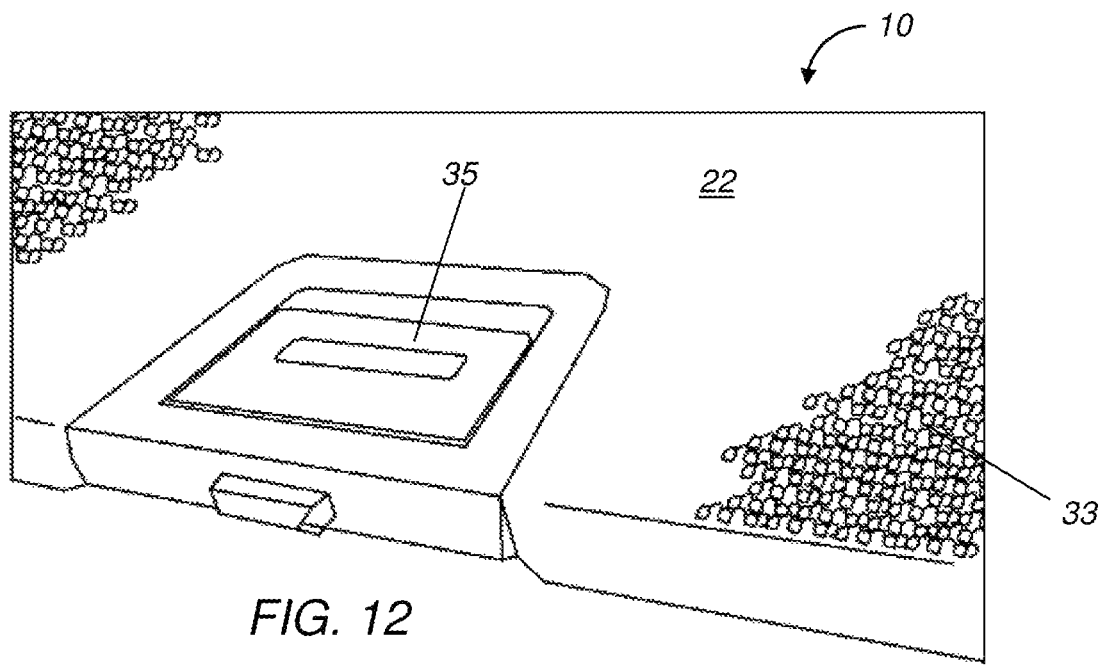
FIGS. 12 and 13 are partial perspective views of a top (or "A-side") and a bottom (or "B-side"), respectively, of an exemplary load structure.
Figure 13:
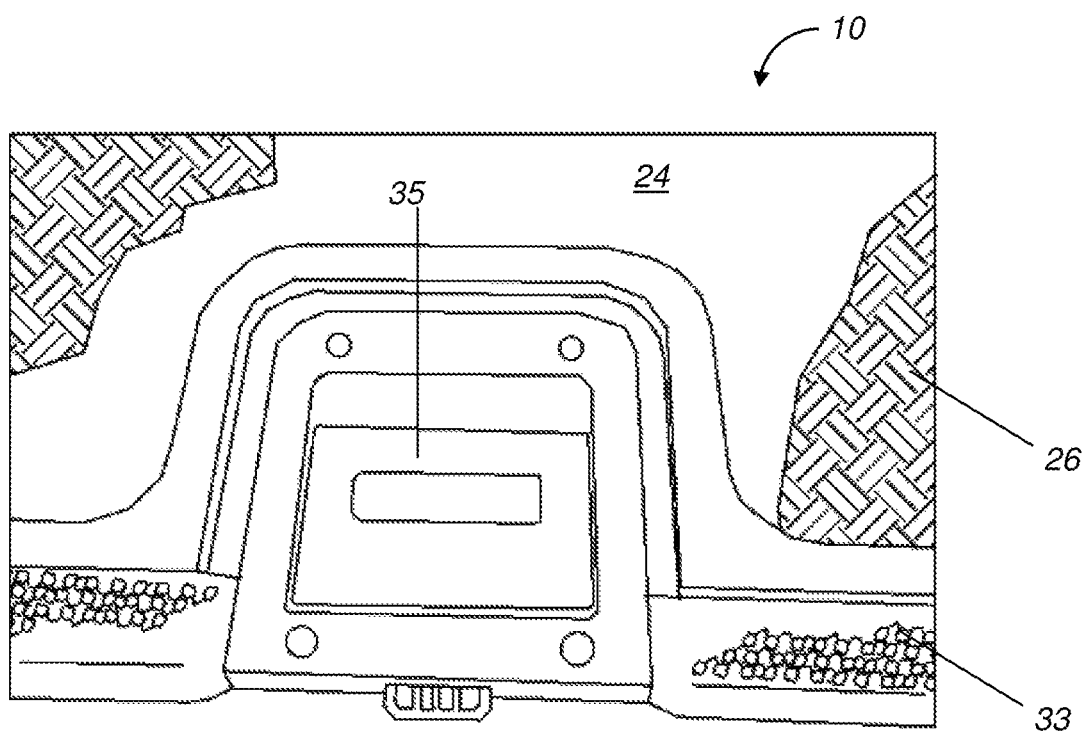

Referring now to FIGS. 12 and 13, the load structure 10 is shown in a perspective view depicting the FIG. 1 structure. In this embodiment, the load structure 10 is a releasable and repositionable vehicle member that can be located in the rear section of the vehicle whereby articles may be placed thereon. The load structure 10 is suited for accommodating dry, wet, heavy and light weight articles that may be placed thereon. The load structure 10 is operable to deflect minimally under wet and dry conditions. This is partially accomplished due to the reinforced honeycomb structure at the core of the load structure 10 coupled with the inclusion of the moisture impervious layer on at least one side (22 and/or 24) of the system. It will be appreciated that while FIGS. 12 and 13 show a moisture impervious layer on one side (side 24), that both sides may have a moisture resistant feature so as to enhance the integrity of the load structure 10. Thus, in one embodiment a unitary load structure 10 is provided that has a moisture impervious layer on one side, a consumer-friendly layer with carpet and the like on the other side, all combined with an improved core. Alternatively, a unitary load structure 10 may be provided that has a moisture impervious layer around the entire exterior surface (22, 24 and all sides and ports) in combination with an improved core. Thus, the load structure 10 may be sealed and provide a moisture impervious layer or feature about its entire exterior surface. Such structure would be highly impervious to moisture conditions thus making the load structure attractive for use with wet gear, swimming gear, fishing gear, hunting gear, skiing equipment, and the like. Also, for those consumers that tailgate at sporting events, a load structure 10 is provided that has a moisture resistant cleanable surface that can be easily cleaned up after events. For example, the load structure 10 may be removed from a vehicle and washed, dried and repositioned back in to the vehicle. A handle, described herein, may be deployed to releasably permit the load structure 10 to be selectively detached form the vehicle. Thus, the load structure 10 is securable and lockable. It will be appreciated that the surface 24 may include a surface treatment that permits it to be more easily cleaned and sanitized for consumer use situations.

With continued reference to FIG. 12, it illustrates the first side 22 (or "A-side) and FIG. 13 illustrates the second side 24 (or "B-side"). As seen in FIG. 12, the first side 22 has a layer 33 of carpet or felt covering it. As seen in FIG. 13, the second side 24 may have an over rim coating 26 on at least a portion thereof, and a layer 33 of carpet or felt wrapped around an edge, though it should be appreciated that the second side 24 may have no carpet 23 wrapped around the edge. The load structure 10 has a handle 35 that may be accessible from either the first side 22 or the second side 24. This enables a user the option of having either the first side 22 or the second side 24 exposed, while still maintaining the functionality associated with the handle 35. Thus, the load structure 10 is reversible, symmetrically designed, resulting in a consumer being able to deploy a finished carpet like surface or a utilitarian like surface where dirty and wet articles can be placed on the load structure 10 without diminishing its integrity.

Figure 8:
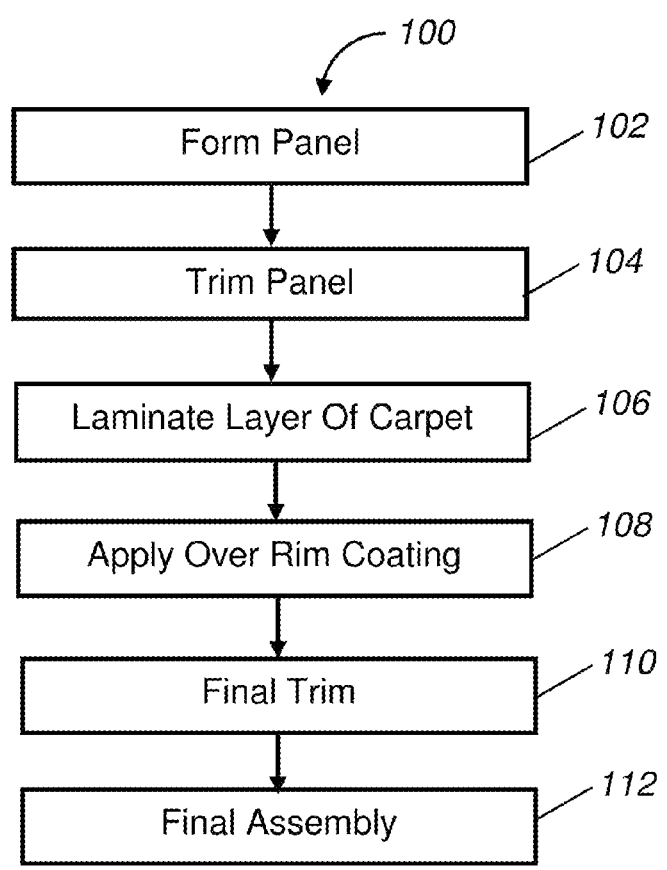
FIG. 8 is a schematic flow diagram of an exemplary process for manufacturing the load structure of FIGS. 1 and 2.

Referring now to FIG. 8, an exemplary process 100 for manufacturing a load structure 10 having a non-edge wrapped configuration, as illustrated in FIGS. 1 and 2, is shown. Process 100 may begin at step 102 in which the panel 12 may be formed. This step may involve transporting a core 14 of material, e.g., paper honeycomb 16 with a glass layer 18 around the honeycomb 16, from a load station to a spray cell. In one exemplary approach, such transporting may be done by a robot with an end of arm tool designed to grip the core 14 in a non-critical area. The core 14 may then be coated with a polyurethane layer 20 with a 2-part polyurethane system, with an amount adequate to encapsulate the glass and bond to the underlying paper honeycomb. The polyurethane may be spray-applied in an even layer over the surface of the core 14, with additional urethane applied where required to fill geometry.

The sprayed core 14 may then be placed into a heated mold. The mold which generally may have the basic geometry of the panel 12, including a footprint of the final load structure 10 and additional material to be trimmed later in process 100, as seen in FIG. 5. The basic geometry may also include one or more protrusions 28 on the second side 24 of the panel 12, as described above. The mold may then be closed for a duration long enough to cure the polyurethane and form the panel 12.

Step 102 may also include coating the panel 12 with a barrier material. As explained above, where the barrier material is glass, fiber, scrim, or paper, the barrier material may be disposed on the panel 12 before applying the polyurethane layer 20. Where the barrier material is TPU, the barrier material may be disposed on the panel on top of the polyurethane layer 20. For example, the TPU may be placed as a film within the mold prior to the core 14 being placed therein. Then, when the mold is closed and heated, the TPU may be applied, as described in more detail hereinafter. The mold generally may have the basic geometry of the panel 12, including the fill passage 32.

After step 102, process 100 may proceed to step 104 at which the panel 12 may be trimmed. After the polyurethane which created the structure and shape of the panel has cured, the part may be removed from the mold, conditioned, e.g., trimmed (about its perimeter and elsewhere as needed) in a second tool, and the fill passage 32 may be cleared. As seen in FIG. 6, the fill passage 32 may be located outside of the final footprint of the load structure 10.

After step 104, process 100 may proceed to step 106 at which the first side 22 of the panel 12 may be provided, e.g., laminated with carpet 23, felt, or a similar material. A piece of felt or carpet laminated to a TPU film having a thickness, for example, of 1.5-2.5 mm thick, may be cut larger than the footprint of the trimmed panel, for example, by an extended 10-13 mm from a perimeter of the panel footprint. The piece of felt or carpet may then be laminated to the side opposite of the side to be coated, over lapping the edge of the part by a certain amount, for example, by 10-13 mm. This may be accomplished by use of a reactive adhesive, including, but not limited to, polyurethane. The piece of felt or carpet, which generally may be rectangular shaped, may have four holes (one per corner) outside the perimeter of the part for use in locating in the over rim mold. However, it should be appreciated that it may have more or less holes, and further, that the geometry of the piece of felt or carpet may be any other polygonal and/or circular/curved shape.

After step 106, process 100 may proceed to step 108 at which the panel 12 may be over rimmed, i.e., the over rim coating 26 may be applied to the second side 24 of the panel 12 as shown in FIG. 4. The over rimming may be performed by an over rim tool 200, as illustrated in FIGS. 10 and 11.

Figure 10:
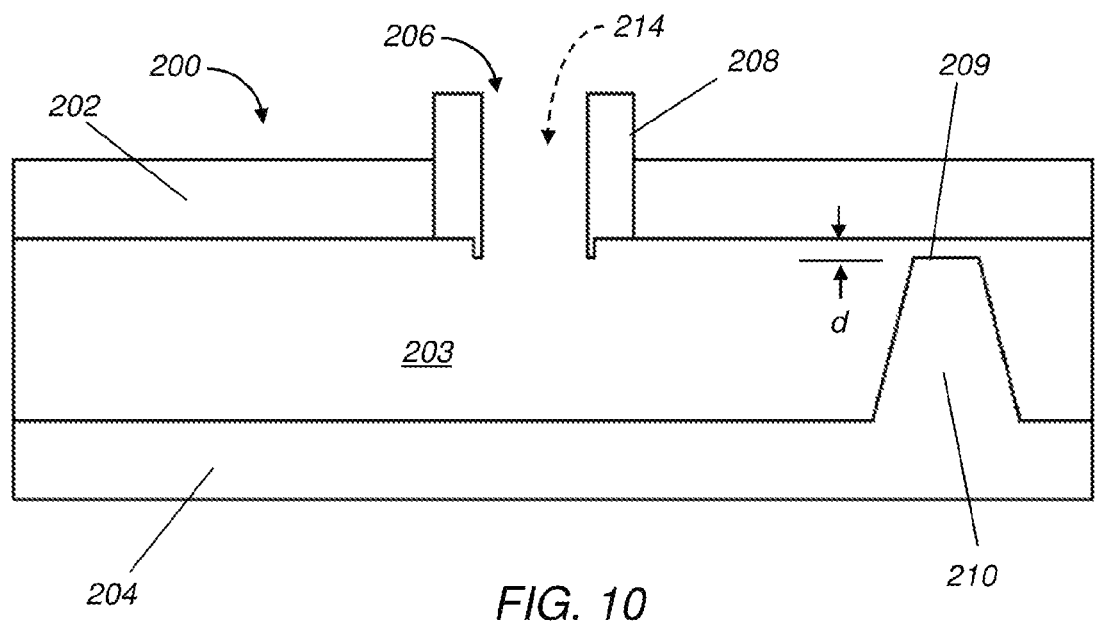
FIG. 10 is a schematic cross-section of an over mold tool used in the processes of FIGS. 5 and 6.
Figure 11:
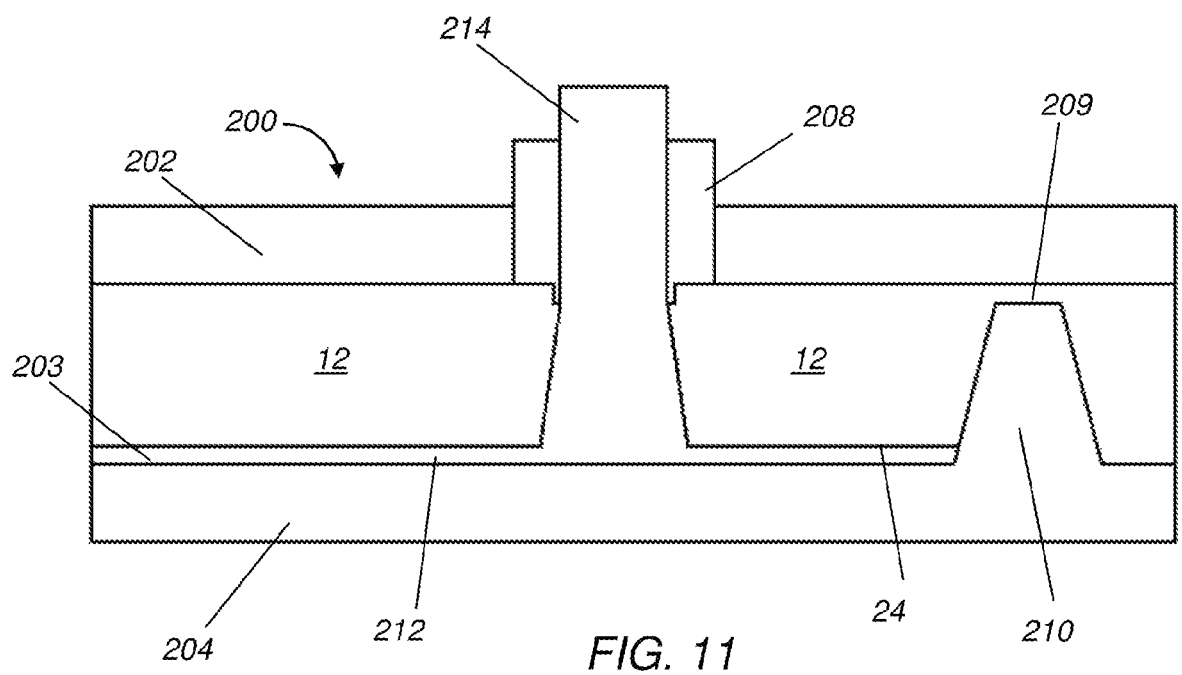
FIG. 11 is a schematic cross-section of the over mold tool of FIG. 10 with a panel inserted therein.

Referring now to FIGS. 10 and 11, the over rim tool 200 may include a first tool portion 202 and a second tool portion 204 defining a cavity 203 therebetween when the over rim tool 200 is closed, in which the panel 12 is to be placed. The first tool portion 202 may include an opening or passage 206 through which an injection gun 208 may be inserted or fitted or otherwise attached to first tool portion 202. The injection gun 208 is configured for injecting a coating 214 (e.g., coating 26, among others). The second tool portion 204 may include a projection 210 extending towards the first tool portion 202. When the over rim tool 200 is in a closed configuration, an end 209 of the projection 210 may be spaced apart from first tool portion 202 by a distance d, which may range from 0.5 mm to 4.0 mm.

The panel 12 may be placed in the cavity 203 of the over rim tool 200 with the first side 22 up, i.e., facing the first tool portion 202, and the second side 24 down, i.e., facing the second tool portion 202. When the over rim tool 200 is in a closed configuration, as illustrated in FIG. 11, the projection 210 may pinch or seal the panel 12 against the first tool portion 202 such that there may be a gap 212 between the second side 24 of the panel 12 and the second tool portion 204. The gap 212 generally may define the thickness of the over rim coating 26 and may have the same dimension as the distance d between the end 209 of the projection 210 and the first tool portion 202. The excess carpet or carpet flange may be tramped between the first and second tool portions 202, 204, forming a seal around the perimeter of the part, except those locations where venting may be required, allowing air being displaced by the over rim coating 26 to escape.

Once the panel 12 is secured in the over rim tool 200, the coating 214 may be injected via the injection gun 208 (e.g., an injection tool, a mix head tool, among others) through the fill passage 32 in the panel 12 until the gap 212 is filled. The fill pressure at which the coating 214 may be injected generally may be dependent upon such factors, including, but not limited to, gel time of the coating 214 and the amount of coating 214 needed for the over rim coating, and may range, for example, from 2 bar to 200 bar.

After step 108, process 100 may proceed to step 110 at which the panel 12 may undergo final trimming. The panel may be removed from the mold and placed in a second trim tool, which may be designed to remove any excess carpet flange and fill location to the final footprint of the load structure 10.

Process 100 may end after step 112 during which the panel may undergo final assembly, for example, by attaching a handle, hardware or other external feature(s) to the panel.

Figure 9:
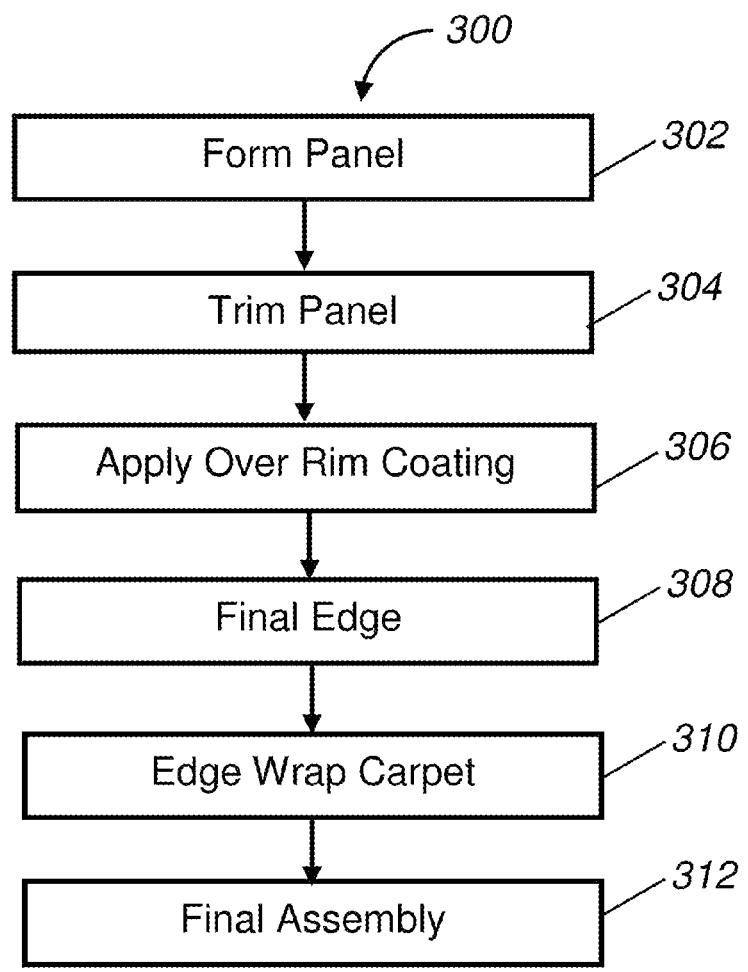
FIG. 9 is a schematic flow diagram of an exemplary process for manufacturing the load structure of FIGS. 3 and 4.

Referring now to FIG. 9, an exemplary process 300 for manufacturing a load structure 10 having an edge-wrapped configuration, as illustrated in FIGS. 3 and 4, is shown. Process 300 may begin at step 302 in which the panel 12 may be formed. This step may involve transporting a core 14 of material, e.g., one or more honeycomb layers 16 with a glass layer 18 around the honeycomb 16, from a load station to a spray cell. In one exemplary approach, such transporting may be done by a robot with an end of arm tool designed to grip the core 14 in a non-critical area. The core 14 may then be coated with a polyurethane layer 20 with a 2-part polyurethane system, with an amount adequate to encapsulate the glass and bond to the underlying paper honeycomb. The polyurethane may be spray-applied in an even layer over the surface of the core 14, with additional urethane applied where required to fill geometry.

The sprayed core 14 may then be placed into a heated mold. The mold which generally may have the basic geometry of the panel 12, including a footprint of the final load structure 10 and additional material to be trimmed later in process 300. The basic geometry may also include one or more protrusions 28 on the second side 24 of the panel 12, as described above. The mold may then be closed for a duration long enough to cure the polyurethane and form the panel 12.

Step 302 may also include coating the panel 12 with a barrier material. As explained above, where the barrier material is glass, fiber, scrim, or paper, the barrier material may be disposed on the panel 12 before applying the polyurethane layer 20. Where the barrier material is TPU, the barrier material may be disposed on the panel on top of the polyurethane layer 20. For example, the TPU may be placed as a film within the mold prior to the core 14 being placed therein. Then, when the mold is closed and heated, the TPU may be applied, as described in more detail hereinafter. The mold generally may have the basic geometry of the panel 12, including the fill passage 32.

After step 302, process 300 may proceed to step 304 at which the panel 12 may be conditioned, e.g., trimmed. After the polyurethane which created the structure and shape of the panel has cured, the part may be removed from the mold, trimmed (perimeter) in a second tool, and the fill passage 32 may be cleared. As seen in FIG. 5, the fill passage 32 may be located within the final footprint of the load structure 10.

After step 304, process 300 may proceed to step 306 at which the panel 12 may be over rimmed, i.e., the over rim coating 26 may be applied to the first side or the second side 24 of the panel 12. The over rimming may be performed by an over rim tool 200, as illustrated in FIGS. 10 and 11. The panel 12 may be placed in the cavity 203 of the over rim tool 200 with the first side 22 up, i.e., facing the first tool portion 202, and the second side 24 down, i.e., facing the second tool portion 202. When the over rim tool 200 is in a closed configuration, as illustrated in FIG. 11, the projection 210 may pinch or seal the panel 12 against the first tool portion 202 such that there may be a gap 212 between the second side 24 of the panel 12 and the second tool portion 204. The gap 212 generally may define the thickness of the over rim coating 26 and may have the same dimension as the distance d between the end of the projection 210 and the first tool portion 202.

Once the panel 12 is secured in the over rim tool 200, the coating 214 (e.g., coating 26, among others) may be injected via the injection gun 208 through the fill passage 32 in the panel 12 until the gap 212 is filled. The fill pressure at which the coating 214 may be injected generally may be dependent upon such factors, including, but not limited to, gel time of the coating 214 and the amount of coating 214 needed for the over rim coating, and may range, for example, from 2 bar to 200 bar.

After step 306, process 300 may proceed to step 308 at which time the panel 12 may undergo final trimming. The panel may be removed from the mold and placed in a second trim tool, which may be designed to remove any excess material, i.e., the material beyond the footprint of the load structure 10, including where the fill passage 32 is located.

After step 308, process 300 may proceed to step 310 at which the edge may be wrapped. A piece of carpet die-cut to a specific shape may be attached to the first side 22 of the panel 12 and wrapped around the edges of the panel 12 to the second side 24 at least partially along a perimeter of the panel 12, ending after overlapping a portion of the over rim coating 28.

Process 300 may end after step 312 during which the panel may undergo final assembly, for example, by attaching a handle or other external feature to the panel.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Referring now to FIGS. 14-16, a vehicle component 400 according to one exemplary approach is illustrated. While the vehicle component 400 is illustrated as a storage compartment, for example, in a trunk of a vehicle, it should be appreciated that the vehicle component may be any other component in a vehicle. The vehicle component 400 generally may have a front trim member 402, a rear trim member 404, and side walls 406 therebetween that define a compartment 408. The front and rear trim members 402, 404 may allow the vehicle component 400 to be installed within a vehicle, not shown. The vehicle component 400 may also include a divider wall 412 that may divide the compartment 408 into sub-compartments $408_1$ and $408_2$. It should be appreciated that there may be multiple divider walls 412 that divide the compartment 408 into more than two sub-compartments, and further that the sub-compartments may be the same or different size, shape, and/or configuration depending upon the location and orientation of the divider wall(s) 412.

The vehicle component 400 may further include a stowable repositionable cover 410 configured to cover all or portions of the compartment 408. The stowable cover 410 may be a load structure 10, as described above, and may have an edge-wrapped configuration or a non-edge wrapped configuration. The stowable cover 410 may be movable from a closed position, as illustrated in FIG. 14, to an open position as is shown in FIG. 15, to a fully deployed position (as shown in FIG. 16) in which the cover 410 may be elevated in the air and substantially level so that it may be usable as a shelf or platform. Thus, the component 400 can be a locatable shelf that can be stowed in the vehicle. The side walls 406 and the front trim member 402 generally may include a mating edge 414, which may be depressed such that the cover 410 may sit flush with the front trim member 402 and/or the rear trim member 404. The cover 410 may be attached to each side wall 406 via a pivoting mechanism 416, which may include, but is not limited to, a hinge 418 and an extension member 420 connecting the hinge 418 and the cover 410. The pivoting mechanism 416 generally may enable the cover 410 to rotate from the closed position, as seen in FIG. 14, to a deployed position as is shown in FIG. 16. As further seen in FIG. 14, the vehicle component 400 may include a rear transversely extending channel 422 into which a rear edge 424 of the cover 410 may rotate into. The extension member 420 may have a latch at one end for securing the cover 410 into the horizontal position shown in FIG. 16. This construction provides a secure table-like construction for a consumer to place articles thereon, such as for example, when tailgating at a sporting event. The cover 410 may further be rotatably connected to the extension member 420 such that it may rotate out into the deployed position (FIG. 16) to the stored position as is shown in FIG. 14.

Figure 17:
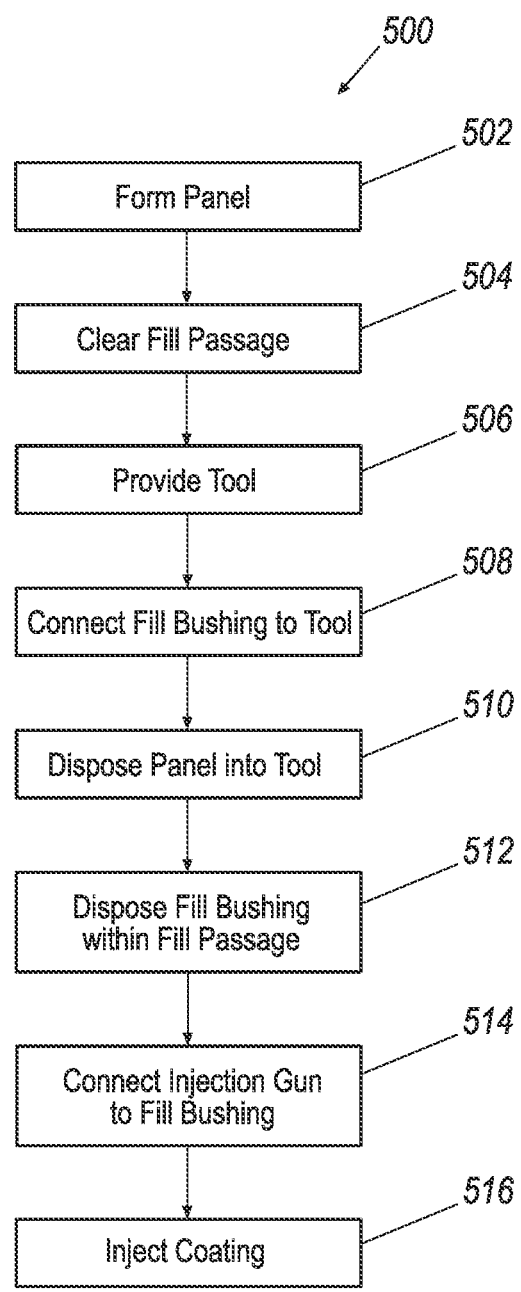
FIG. 17 is a schematic flow diagram of an exemplary process for manufacturing a load structure using a fill bushing.

Referring now to FIG. 17, an exemplary process 500 for manufacturing a load structure 10 using a fill bushing 600 is shown. The process 500 may include, but is not limited to, forming a panel 502, clearing a fill passage 504, providing a tool 506, connecting a fill bushing to the tool 508, disposing or placing the panel into the tool 510, disposing the fill bushing into a fill passage of the panel 512, connecting an injection gun to the fill bushing 514, and injecting a coating or other fluid like material 516 through the fill bushing and the fill passage. It will be appreciated that other steps may be deployed. Process 500 may begin at step 502 in which a panel 12 is formed. Step 502 may be substantially similar to step 102 of process 100 and/or step 302 of process 300. For instance, the panel of process 500 may be formed in a similar manner as described in process 100 and/or process 300. For examples including a core 14 of a panel 12 having more than one honeycomb layer 16 (e.g., FIG. 2B), process 500 may include applying one or more intermediate layers 40 to a first honeycomb layer 16a or a second honeycomb layer 16b. Process 500 may include stacking the first honeycomb 16a onto the second honeycomb layer 16b such that the one or more intermediate layers 40 are disposed between the first honeycomb layer 16a and the second honeycomb layer 16b, and/or the first honeycomb layer 16a is fixed to the second honeycomb layer 16b.

Figure 19:
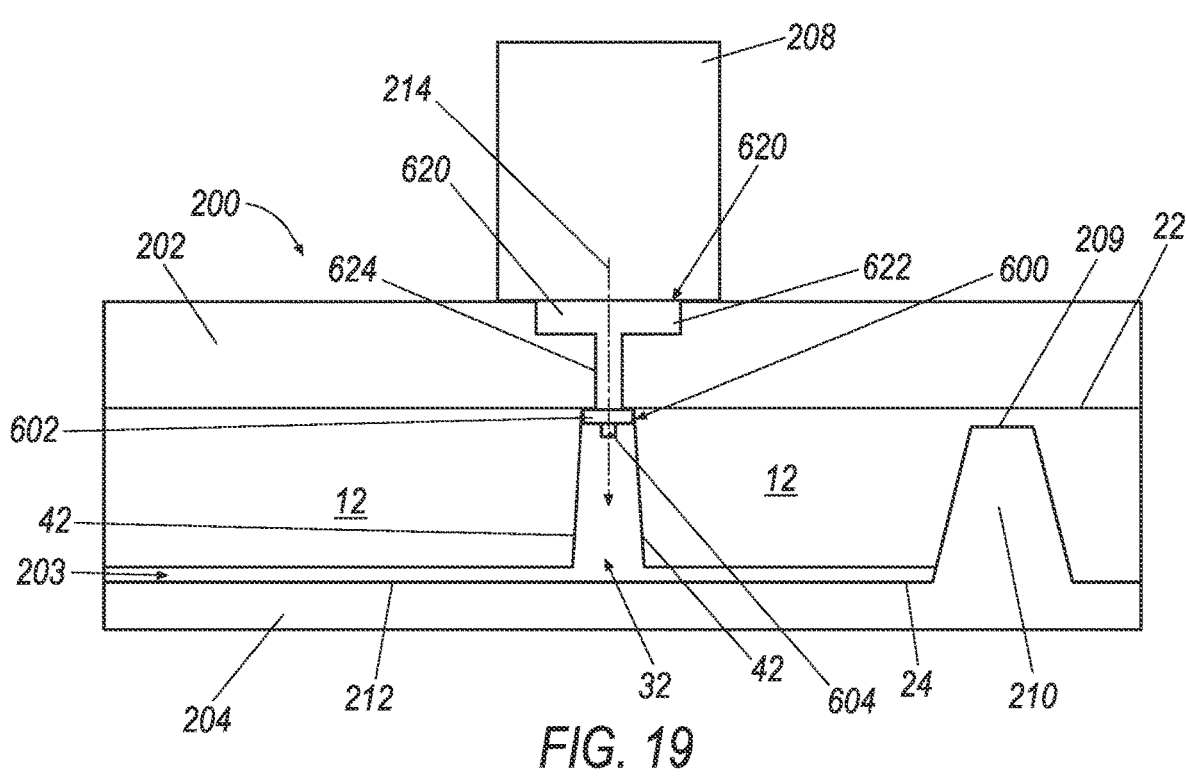
FIG. 19 is a schematic cross-section of the tool of FIG. 18 with a panel inserted therein.

After step 502, process 500 may proceed to step 504 in which the panel 12 may be trimmed and/or a fill passage 32 may be cleared so as to provide a clear passageway for resins, coatings, or other materials to flow smoothly therethrough. As illustrated in FIG. 19, the fill passage 32 may be cleared entirely through the panel 12. For instance, the fill passage 32 may extend from a first side 22 to a second side 24 of a panel 12. The diameter of the fill passage 32 at the second side 24 is larger than the diameter of the fill passaged 32 at the first side 22. In some example configurations, the fill passage 32 may be tapered (see, e.g., FIG. 7) to provide a smooth and continuous delivery of material to the second side 24. Step 504 may be substantially similar to step 104 of process 100 and/or step 304 of process 300. For instance, the panel 12 of process 500 may be trimmed and/or the fill passage 32 may be cleared in a similar manner as described in process 100 and/or process 300.

In some example configurations, after step 504, another step may be provided wherein the panel 12 may be provided with, e.g., laminated with felt 23, carpet, or a similar material. The felt 23 may be provided to the first side 22 and/or the second side 24 of the panel 12. The felt 23 may be applied to the panel 12 in a similar manner as in step 106 of process 100.

Figure 18:
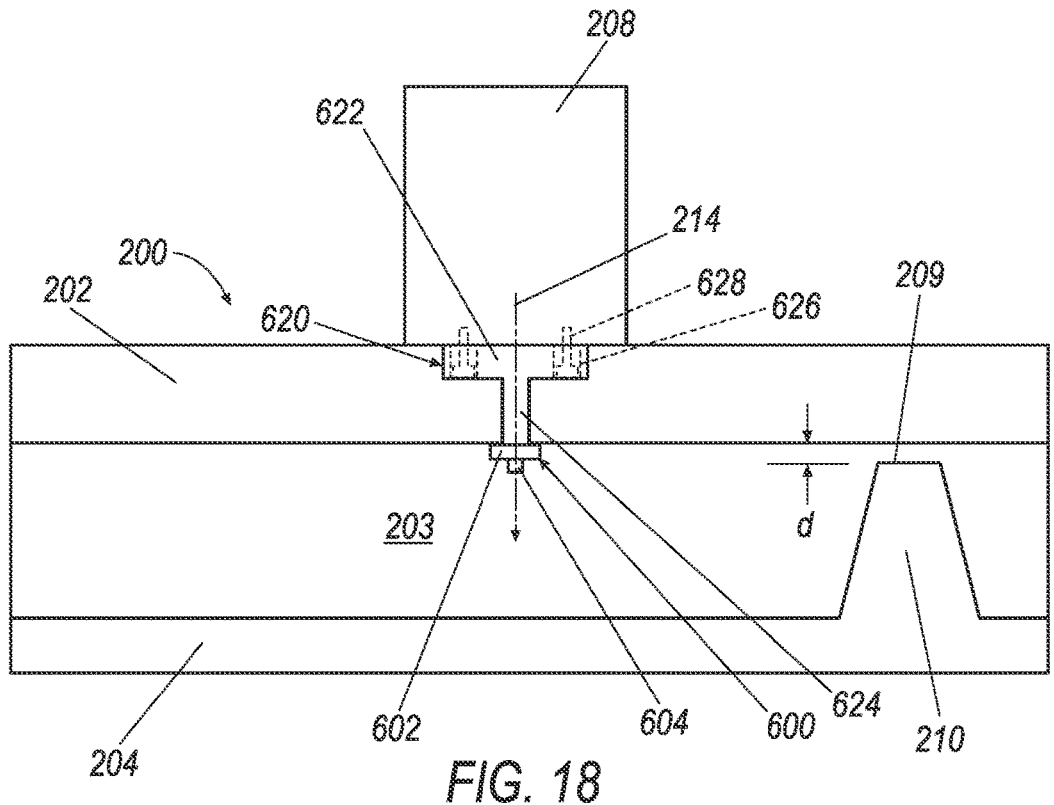
FIG. 18 is a schematic cross-section of a tool used in the process of FIG. 17.

The next step of process 500 may include providing a tool 200 (step 506). Referring now to FIG. 18, the tool 200 (e.g., an over rim tool) may include a first tool portion 202 and a second tool portion 204. The first tool portion 202 and the second tool portion 204 may collectively define a tool cavity 203, for example, when the tool 200 is in a closed configuration as is shown.

With reference to FIGS. 18 and 19, after step 506, process 500 may proceed to step 508 in which a fill bushing 600 is provided and/or a fill busing 600 is connected to the tool 200. The fill bushing 600 may be connected to the first tool portion 202 or the second tool portion 204. In some example configurations, the fill bushing 600 may be secured to the first tool portion 202 or the second tool portion 204 (e.g., via welding, an adhesive, and/or one or more fasteners, among others). In some instances, the fill bushing 600 may be in contact with the first tool portion 202 or the second tool portion 204. In some examples, the fill bushing 600 may be spaced apart from and not in contact with the first tool portion 202 or the second tool portion 204.

Figure 20:
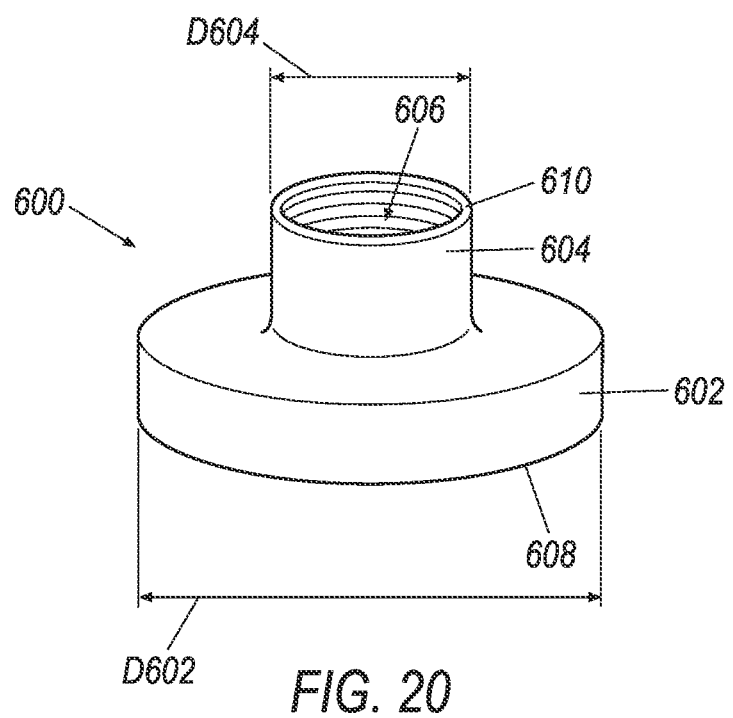
FIG. 20 is a perspective view of a fill bushing used in the process of FIG. 17.

Referring now to FIG. 20, a fill bushing, or cylindrical member, 600 may include various shapes, sizes, configurations, and/or materials. In some example configurations, a fill bushing 600 may include a radially extending flange 602 and/or an axially extending projection 604 (e.g., an additional portion) extending from the flange 602. In some instances, the flange 602 and the projection 604 may include cylindrical configurations. The flange 602 has a diameter D602 and the projection 604 has a diameter D604. In some examples, diameter D602 may be greater than diameter D604. The fill bushing 600 includes a fluid passage 606 that extends from a first end 608 to a second end 610 of the fill bushing 600. The fill bushing 600 may comprise a metal material and may have internal threads to enhance connectivity to the first portion of the tool 202.

After step 508, process 500 may proceed to step 510 in which the panel 12 is disposed (e.g., placed) or otherwise loaded in the cavity 203 of the tool 200. In some examples, disposing the panel 12 within the cavity 203 includes positioning the panel 12 such that the fill bushing 600 is aligned (e.g., concentrically) with the fill passage 32.

Referring now to FIG. 19, after step 510, process 500 may proceed to step 512 in which at least a portion of the fill bushing 600 is disposed (e.g., positioned) within the fill passage 32 of the panel 12. In an assembled configuration, the flange 602 of the fill bushing 600 may engage a portion of an interior wall 42 of the panel 12. For instance, disposing the fill bushing 600 within the fill passage 32 may include press fitting (e.g., friction fitting and/or interference fitting) the fill bushing 600 to the interior wall 42 of the panel 12.

After step 512, process 500 may proceed to step 514 in which an injection gun 208 is connected to the fill bushing 600 and/or an injection gun 208 is positioned such that the injection gun 208 engages the fill bushing 600. Referring now to FIGS. 18 and 19, an injection gun 208 may be connected to the first tool portion 202 or the second tool portion 204. The injection gun 208 may include a nozzle 620. In an assemble configuration, the fill bushing 600 may be connected to the nozzle 620. For instance, the fill bushing 600 may be fixed to, integral therewith, and/or may be in contact with the nozzle 620.

Figure 21:
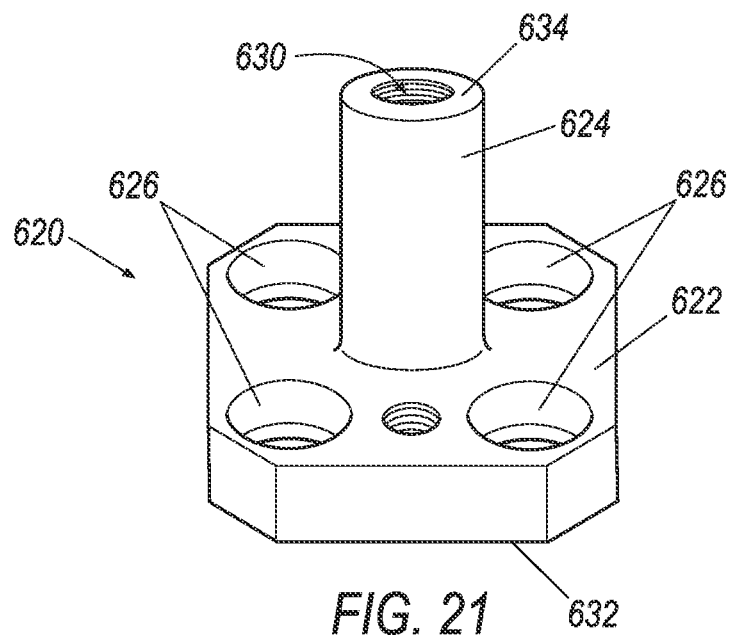
FIG. 21 is a perspective view of a nozzle of an injection gun used in the process of FIG. 17.

Referring now to FIG. 21, a nozzle 620 may include various shapes, sizes, configurations, and/or materials. A nozzle 620 may include a base 622 and a protrusion 624 extending from the base 622. In some example configurations, the protrusion 624 may include a cylindrical configuration and/or the protrusion 624 may extend from a center of the base 622. The base 622 may include a plurality of voids 626 that are disposed about the protrusion 624. The nozzle 620 (e.g., the base 622) may be connected to the injection gun 208 via a plurality of fasteners 628 (e.g., bolts, screws, among others). In an assembled configuration, a portion of a fastener 628 may be disposed within a corresponding void 626 (see, e.g., FIG. 18).

Figure 22:
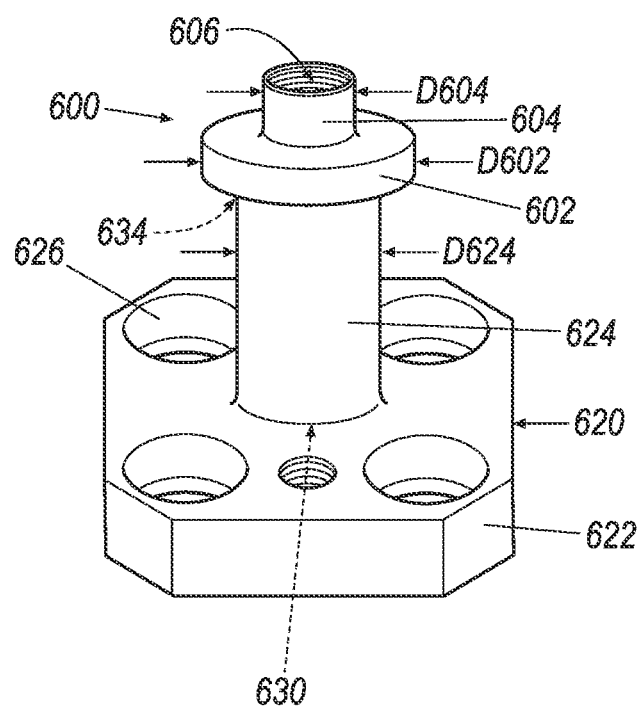
FIG. 22 is a perspective view of a fill bushing connected to a nozzle used in the process of FIG. 17.

With continued reference to FIG. 21, the nozzle 620 may include a fluid passage 630 that extends from a first end 632 to a second end 634 of the nozzle 620. Referring now to FIG. 22, the fill bushing 600 may be connected to a terminal end 634 of the protrusion 624. For instance, the fill bushing 600 may be fixed and/or may be in contact with the protrusion 624. When the fill bushing 600 is connected to the nozzle 620, the fluid passage 606 of the fill bushing 600 may be in fluid communication with the fluid passage 630 of the nozzle 620. In some example configurations, the protrusion 624 may have a diameter D624 which may be smaller than the diameter D602 of the flange 602 of the fill bushing 600.

Referring now to FIG. 19, after step 514, process 500 may proceed to step 516 in which a coating 214 (e.g., coating 26, resin, or some other fluid like material) is injected via the injection gun 208 through the nozzle 620, the fill bushing 600, and then into the fill passage 32 such that the coating 214 at least partially covers a side (e.g., side 24) of the panel 12. The injection step 516 continues until the coating 214 fills the gap or void 203. The injection gun 208 may sense a back pressure once the void 203 is full of coating 214 and at which time the gun 208 may terminate the flow of coating 214. Alternatively, the gun 208 may deliver the coating 214 for a predetermined time period/cycle and once the cycle is complete, the gun 208 may terminate the cycle. The flange 602 of the fill bushing 600 is arranged/located all or at least partially within the fill passage 32 (e.g., press fitted to interior wall 42) to block the coating from contacting the other side (e.g., side 22) of the panel 12. Accordingly, the flow direction of the coating 214 and/or the location of the coating coverage on the panel 12 is controlled at least in part via the fill bushing 600.

After step 514, the panel 12 will cure and then it may undergo a final trimming process where a tool can be deployed to finish the panel 12 to a final user quality condition. The panel 12 may be removed from the tool 200 and placed in an additional trim tool, which may be designed to remove any excess material such that the panel 12 is trimmed to the final footprint of the load structure 10. For instance, the panel 12 of process 500 may be trimmed in a similar manner as described in process 100 and/or process 300.

After the final trimming step, the panel 12 may undergo final assembly, for example, by attaching a handle, hardware, or other external feature(s) to the panel 12. For instance, the panel 12 of process 500 may undergo final assembly in a similar manner as described in process 100 and/or process 300.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of manufacturing a load structure, the method comprising:
   forming a panel having a first side and a second side;
   clearing a fill passage through the panel, the fill passage extending from the first side to the second side, and the fill passage is defined by an interior wall of the panel;
   providing a tool having a first tool portion, a second tool portion, and a cavity disposed between the first tool portion and the second tool portion;
   connecting a fill bushing to the first tool portion or the second tool portion of the tool, the fill bushing includes a flange;
   disposing the panel within the cavity of the tool;

disposing the fill bushing within the fill passage of the panel such that the flange of the fill bushing engages a portion of the interior wall;
connecting an injection gun to the fill bushing; and
injecting a material, via the injection gun, through the fill bushing and the fill passage such that one of the first side or the second side of the panel is at least partially covered with the material, the fill bushing is arranged within the fill passage to block the material from contacting the other one of the first side or the second side.

2. The method of claim 1, wherein the injection gun includes a nozzle having a base and a protrusion extending from the base; and
connecting the injection gun to the fill bushing includes connecting the protrusion of the nozzle to the fill bushing.

3. The method of claim 2, including:
providing the nozzle with a first fluid passage that extends from a first end of the nozzle to a second end of the nozzle;
providing the fill bushing with a second fluid passage that extends from a first end of the fill bushing to a second end of the fill bushing; and
wherein, in an assembled configuration, the first fluid passage is in fluid communication with the second fluid passage.

4. The method of claim 2, wherein:
the protrusion of the nozzle extends from a center of the base;
the base includes a plurality of voids that are disposed about the protrusion;
the base is connected to the injection gun via a plurality of fasteners; and
in an assembled configuration, a portion of a fastener of the plurality of fasteners is disposed within a void of the plurality of voids.

5. The method of claim 2, including:
providing the protrusion of the nozzle with a first diameter; and
providing the flange of the fill bushing with a second diameter;
wherein the second diameter is greater than the first diameter.

6. The method of claim 5, including providing the fill bushing with an additional portion extending from the flange, the additional portion has a third diameter that is less than the first diameter and the second diameter.

7. The method of claim 1, wherein disposing the fill bushing within the fill passage of the panel includes press fitting the fill bushing to the interior wall.

8. The method of claim 1, wherein injecting the material includes injecting a coating at a fill pressure of approximately 2 bar to approximately 200 bar.

9. The method of claim 1, wherein the material includes one of a coating or polyurethane material.

10. The method of claim 1, wherein forming a panel includes:
providing a first honeycomb layer and a second honeycomb layer;
applying one or more intermediate layers to the first honeycomb layer or the second honeycomb layer; and
stacking the first honeycomb layer onto the second honeycomb layer such that the intermediate layers are disposed between the first honeycomb layer and the second honeycomb layer.

11. The method of claim 1, wherein:
clearing the fill passage through the panel includes tapering the fill passage from the second side of the panel to the first side;
the fill passage includes a first diameter disposed proximate the first side of the panel;
the fill passage includes a second diameter disposed proximate the second side of the panel; and
the first diameter is smaller than the second diameter.

12. The method of claim 1, including providing the first tool portion or the second tool portion with at least one projection, the projection is configured to form a gap between the first tool portion or the second tool portion and the panel; and
injecting the material, via the injection gun, through the fill passage includes filling the gap with the material.

13. The method of claim 12, wherein the gap ranges from approximately 0.5 mm to approximately 4.0 mm.

14. The method of claim 1, wherein disposing the panel within the cavity of the tool includes positioning the panel such that the fill bushing is aligned with the fill passage.

15. A method of manufacturing a load structure, the method comprising:
forming a panel having a first side and a second side;
clearing a fill passage through the panel, the fill passage extending from the first side to the second side;
providing a tool having a first tool portion, a second tool portion, and a cavity disposed between the first tool portion and the second tool portion;
providing a cylindrical member including a flange;
disposing the panel within the cavity of the tool;
disposing the cylindrical member within the fill passage of the panel; and
injecting a coating through the cylindrical member and the fill passage such that one of the first side or the second side of the panel is at least partially covered with the coating, the cylindrical member is arranged with the flange within the fill passage to block the coating from contacting the other one of the first side or the second side.

16. The method of claim 15, wherein disposing the cylindrical member within the fill passage includes providing a friction fit between cylindrical member and the panel.

17. The method of claim 15, including positioning an injection gun such that the injection gun engages the cylindrical member.

18. The method of claim 17, wherein the injection gun includes a nozzle having a base and a protrusion extending from the base; and
positioning the injection gun includes aligning the protrusion of the nozzle such that the protrusion is in contact with the cylindrical member.

19. The method of claim 18, including:
providing the nozzle with a first passage that extends from a first end of the nozzle to a second end of the nozzle;
providing the cylindrical member with a second passage that extends from a first end of the cylindrical member to a second end of the cylindrical member; and
wherein, in an assembled configuration, the first passage is in fluid communication with the second passage.

20. A method of manufacturing a panel, the method comprising:
forming a panel having a first side and a second side;
forming a fill passage through the panel, the fill passage extending from the first side to the second side;

providing a tool having a first tool portion, a second tool portion, and a cavity disposed between the first tool portion and the second tool portion;
providing a cylindrical member including a flange;
locating the panel within the tool;
locating the cylindrical member within the fill passage of the panel;
injecting a material through the cylindrical member and the fill passage such that one of the first side or the second side of the panel is at least partially covered with the material; and
blocking the material with the flange of the cylindrical member to prevent the material from contacting the other one of the first side or the second side of the panel.

\* \* \* \* \*